(No Model.)
W. A. PENFIELD.
LID FOR ALCOHOL LAMPS.
No. 576,413. Patented Feb. 2, 1897.
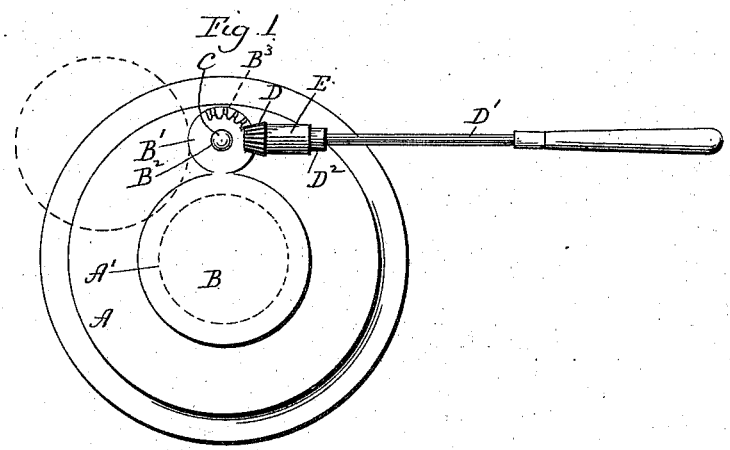
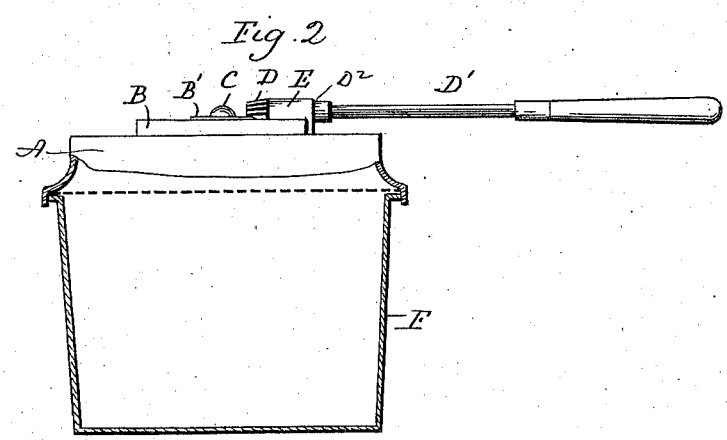

UNITED STATES PATENT OFFICE.

WILLIAM A. PENFIELD, OF MERIDEN, CONNECTICUT, ASSIGNOR TO THE BRADLEY & HUBBARD MFG. CO., OF SAME PLACE.

LID FOR ALCOHOL-LAMPS.

SPECIFICATION forming part of Letters Patent No. 576,413, dated February 2, 1897.

Application filed August 10, 1896. Serial No. 602,239. (No model.)

*To all whom it may concern:*

Be it known that I, WILLIAM A. PENFIELD, of Meriden, in the county of New Haven and State of Connecticut, have invented a new Improvement in Lids for Alcohol-Lamps; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a removable lid for alcohol-lamps constructed in accordance with my invention; Fig. 2, a view thereof, partly in section and partly in side elevation.

My invention relates to an improvement in that class of removable lids for small alcohol-lamps which are formed with central openings and provided with auxiliary lids and handles, the object being to produce a simple, compact, convenient, and effective construction.

With these ends in view my invention consists in the combination, with a main lid having a central opening, of an auxiliary lid pivoted to the main lid to one side of the said opening, so as to swing over and away from the same in a horizontal plane, and a rotatable handle connected with the main lid and with the auxiliary lid so as to oscillate the same.

My invention further consists in certain details of construction and combinations of parts, as will be hereinafter described, and pointed out in the claims.

In carrying out my invention, as herein shown, I employ a main lid A, having a circular central opening A', and provided with a disk-shaped auxiliary lid B, somewhat larger in diameter than the diameter of the said opening, which it is designed to open and close or expose and cover by swinging back and forth or oscillating in a horizontal plane or in a plane parallel with the plane of the main lid, upon the upper face of which the said auxiliary lid rests. The said auxiliary lid is constructed, as herein shown, with a small circular or disk-like extension B', having a central opening or perforation $B^2$, receiving a vertically-arranged pivot C, which passes down through it and pivotally connects the auxiliary lid with the main lid. The said extension has a portion of its edge cut to form a segmental rack $B^3$, composed of beveled teeth and meshed into by a very small bevel-pinion D, located at the extreme inner end of the handle D', which is mounted in a strap-like bearing E, permanently attached to the upper face of the main lid A, the handle being held against endwise movement in the bearing E by means of the pinion $B^2$ aforesaid and by means of a shoulder $D^2$, which bears against the outer end of the said bearing E and which is formed upon the handle. By rotating the handle in one direction or the other the auxiliary lid may be swung over or away from the central opening A', so as to close or expose the same. The handle also forms the means by which the main lid is applied to and removed from the lamp-fount F, which may be of any approved construction. It will be noticed that the handle is not immovably secured to the auxiliary lid, but only operatively connected or combined therewith. When the handle is rotated so as to swing the auxiliary lid into its full open position, as shown in Fig. 1, the rack $B^3$ "runs out," as it were, so that the uncut portion of the extension B' forms a stop, limiting the rotation of the handle, which may then be used to lift the main lid off and on, as though the handle were rigidly instead of rotatably connected with it.

The particular form of the main and auxiliary lids may of course be varied as well as other details of the construction shown and described. I would therefore have it understood that I do not limit myself to the exact construction herein shown, but hold myself at liberty to make such changes and alterations as fairly fall within the spirit and scope of my invention.

Having fully described my invention, what I claim as new, and desire to secure by Letters Patent, is—

1. A removable lid for alcohol-lamps, having a central opening; an auxiliary lid pivoted to the said removable lid so as to swing in a plane parallel with the plane thereof; a handle made independent of both of said lids; a bearing permanently located upon the said removable lid and receiving the inner end of the handle the main portion of which extends outward beyond the edge of the removable lid; and connection between the inner end of the said handle and the said auxiliary lid for oscillating the latter so as to expose and cover the said opening, when the handle is rotated on its longitudinal axis.

2. A removable lid for alcohol-lamps, having a central opening; an auxiliary lid pivoted to the said removable lid so as to swing in a plane parallel with the plane thereof, a rotatable handle having bearing in the main lid, and rack-and-pinion connection between the handle and auxiliary lid for the oscillation of the latter.

3. A removable lid for alcohol-lamps, having a central opening, an auxiliary lid pivoted to the said removable lid so as to swing in a plane parallel with the plane thereof, and formed with an extension by means of which it is pivoted to the said removable lid, and which is provided with a segmental rack, a bearing permanently secured to the said removable lid, a handle mounted in the said bearing for rotation therein, and a pinion located at the inner end of the bearing, and meshing into the said rack, whereby the rotation of the handle is used to swing the auxiliary lid so as to close or expose the said opening.

In testimony whereof I have signed this specification in the presence of two subscribing witnesses.

WILLIAM A. PENFIELD.

Witnesses:
   J. ROBERTS, Jr.,
   W. A. HALL.